US010884170B2

(12) United States Patent
Li

(10) Patent No.: US 10,884,170 B2
(45) Date of Patent: Jan. 5, 2021

(54) MANUFACTURING METHOD OF WIRE GRID POLARIZER

(71) Applicant: SHENZHEN CHINA STAR OPTOELECTRONICS TECHNOLOGY CO., LTD., Shenzhen (CN)

(72) Inventor: Dongze Li, Shenzhen (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 48 days.

(21) Appl. No.: 16/349,639

(22) PCT Filed: May 17, 2017

(86) PCT No.: PCT/CN2017/084684
§ 371 (c)(1),
(2) Date: May 14, 2019

(87) PCT Pub. No.: WO2018/188150
PCT Pub. Date: Oct. 18, 2018

(65) Prior Publication Data

US 2019/0331839 A1 Oct. 31, 2019

(30) Foreign Application Priority Data

Apr. 10, 2017 (CN) .......................... 2017 1 0229584

(51) Int. Cl.
*C25D 3/48* (2006.01)
*C25D 3/54* (2006.01)
*C25D 5/02* (2006.01)
*C25D 21/12* (2006.01)
*G02B 5/30* (2006.01)

(52) U.S. Cl.
CPC ............ *G02B 5/3058* (2013.01); *C25D 3/48* (2013.01); *C25D 3/54* (2013.01); *C25D 5/02* (2013.01); *C25D 21/12* (2013.01); *G02B 2207/101* (2013.01)

(58) Field of Classification Search
CPC ......... C23C 18/14; C23C 18/145; C25D 3/02; C25D 3/48; C25D 3/54; C25D 5/02; C25D 5/024; G02B 5/3058
See application file for complete search history.

(56) References Cited

U.S. PATENT DOCUMENTS

2011/0293847 A1* 12/2011 Hastings ............ C23C 18/1667 427/524

* cited by examiner

*Primary Examiner* — Michael P Wieczorek
(74) *Attorney, Agent, or Firm* — Mark M. Friedman

(57) ABSTRACT

A manufacturing method of a wire grid polarizer is provided, including: setting pattern data, where the pattern data correspond to a wire grid structure of the wire grid polarizer; preparing a metal ion solution; immersing at least one surface of a carrier substrate in the metal ion solution; and emitting, by an emitter device, an electron beam to the carrier substrate, and controlling a movement of the electron beam according to the pattern data to deposit a metal on the carrier substrate at a position where the electron beam passes, to form the wire grid structure.

18 Claims, 2 Drawing Sheets setting pattern data, wherein the pattern data correspond to a wire grid structure of the wire grid polarizer, and the wire grid structure comprises a plurality of wire grids which are arranged separately from each other — S11 preparing a metal ion solution — S12 immersing at least one surface of a carrier substrate in the metal ion solution — S13 emitting, by an emitter device, an electron beam to the carrier substrate, and controlling a movement of the electron beam according to the pattern data to deposit a metal on the carrier substrate at a position where the electron beam passes, to form the wire grid structure — S14

MANUFACTURING METHOD OF WIRE GRID POLARIZER

FIELD OF DISCLOSURE

The present invention relates to the field of display technology, and in particular to a manufacturing method of a wire grid polarizer.

BACKGROUND

In comparison to conventional absorbing polymer film polarizers, nanowire grid polarizers allow direction of incident light of an electric field to be perpendicular to a direction of a wire grid to pass through, and are capable of reflecting light from the direction of the electric field parallel to the direction of the wire grid. By adding an anti-reflection film, etc., the nanowire grid polarizers have a much higher ability to transmit light than the conventional polarizers, and transmittance is over 90%, and a contrast ratio is also 10,000:1, thereby greatly increasing the light transmittance and contrast ratio of liquid crystal displays (LCDs), which greatly satisfies a market demand for today's high transmittance and high contrast ratio of LCDs. In addition, because a sub-wavelength wire grid polarizer achieves excellent durability in high temperature or high humidity environments, the wire grid polarizers have unparalleled advantages in areas such as outdoor where reliability is critical.

At present, a nanoimprint technology is generally used to fabricate a wire grid structure. In a process of fabricating the wire grid structure by the nanoimprint technology, the nanoimprinting process is complicated, including printing out a photoresist, demolding, etching metal, removing the photoresist, etching, etc. Due to difficulties in etching the wire grid structure to nanometer line width and height, the fabricated wire grid is prone to collapse, the photoresist is liable to remain, and the etching is non-uniform, which seriously affect a polarization performance of the wire grid, etc. Due to the complicated process and low efficiency, it is difficult to manufacture large-sized and high-precision templates, and industrial production is very difficult.

SUMMARY OF DISCLOSURE

The technical problem to be solved by the present disclosure is to provide a manufacturing method of a wire grid polarizer, which can simplify a manufacturing process of the wire grid polarizer, improve manufacturing precision, and facilitate industrial production.

In order to solve the above technical problem, a technical solution adopted by the present disclosure is to provide a manufacturing method of a wire grid polarizer, and the manufacturing method includes: setting pattern data, where the pattern data correspond to a wire grid structure of the wire grid polarizer, and the wire grid structure includes a plurality of wire grids which are arranged separately from each other; preparing a metal ion solution; immersing at least one surface of a carrier substrate in the metal ion solution; and emitting, by an emitter device, an electron beam to the carrier substrate, and controlling a movement of the electron beam according to the pattern data to deposit a metal on the carrier substrate at a position where the electron beam passes, to form the wire grid structure; where a step of immersing the at least one surface of the carrier substrate in the metal ion solution includes: encapsulating the metal ion solution between two carrier substrates; and where a step of emitting, by the emitter device, the electron beam to the carrier substrate includes: determining a diameter of the electron beam ranging from 0.05 nm to 1 nm.

In order to solve the above technical problem, another technical solution adopted by the present disclosure is to provide a manufacturing method of a wire grid polarizer, and the manufacturing method includes: setting pattern data, where the pattern data correspond to a wire grid structure of the wire grid polarizer, and the wire grid structure includes a plurality of wire grids which are arranged separately from each other; preparing a metal ion solution; immersing at least one surface of a carrier substrate in the metal ion solution; and emitting, by an emitter device, an electron beam to the carrier substrate, and controlling a movement of the electron beam according to the pattern data to deposit a metal on the carrier substrate at a position where the electron beam passes, to form the wire grid structure.

The advantages of the present disclosure are as follows. There are differences from prior art, the present disclosure includes: setting pattern data, where the pattern data correspond to a wire grid structure of the wire grid polarizer, and the wire grid structure includes a plurality of wire grids which are arranged separately from each other; preparing a metal ion solution; immersing at least one surface of a carrier substrate in the metal ion solution; and emitting, by an emitter device, an electron beam to the carrier substrate, and controlling a movement of the electron beam according to the pattern data to deposit a metal on the carrier substrate at a position where the electron beam passes, to form the wire grid structure. After the electron beam passes, the metal ions acquire electrons and are reduced to metal which is deposited in a position corresponding to the pattern data, so that the wire grid structure is formed on the carrier substrate, and the carrier substrate and the wire grid structure constitute the wire grid polarizer. The wire grid polarizer of the present disclosure has simple process and high manufacturing precision, and is favorable for industrial production.

DETAILED DESCRIPTION

Figure 1:
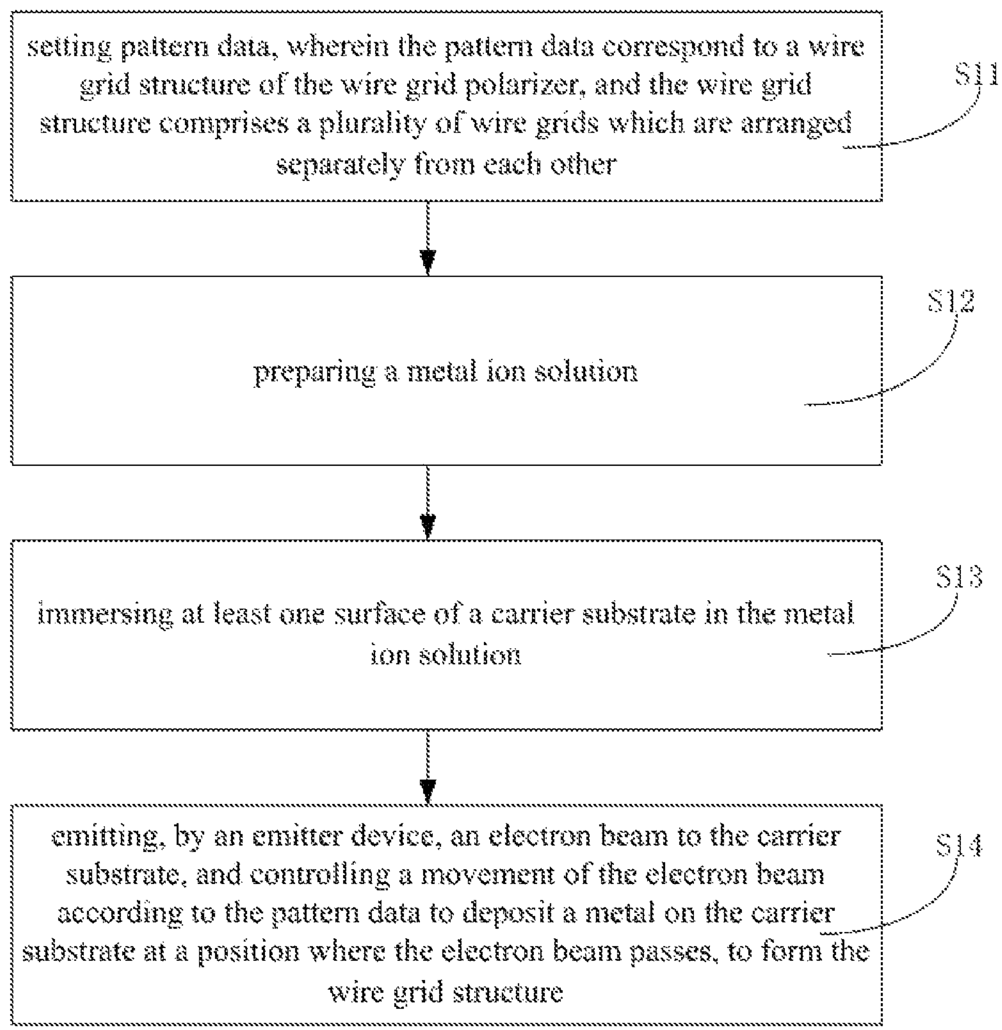
FIG. 1 is a flowchart of a manufacturing method of a wire grid polarizer according to an embodiment of the present disclosure.
Figure 2:
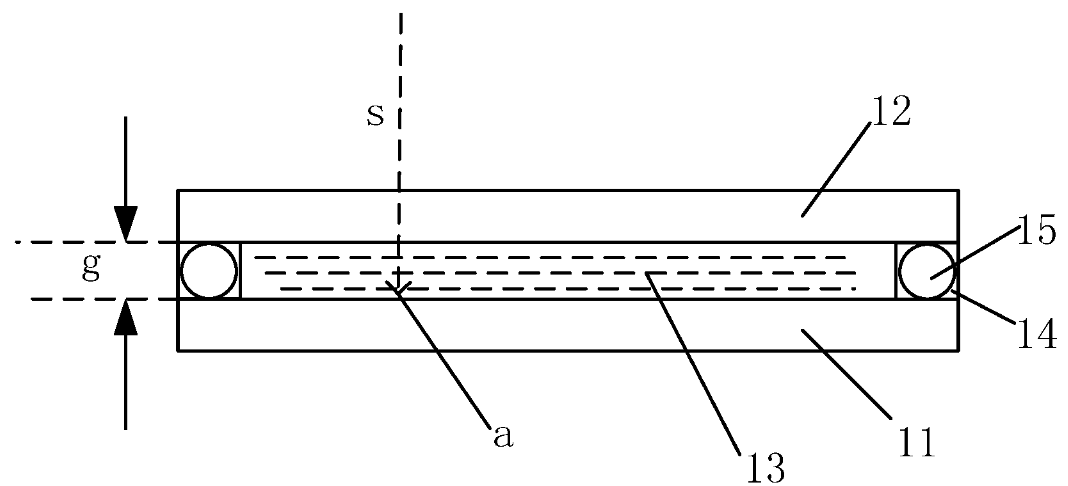
FIG. 2 is a schematic diagram partially illustrating the manufacturing method of the wire grid polarizer according to the embodiment of the present disclosure.
Figure 3:
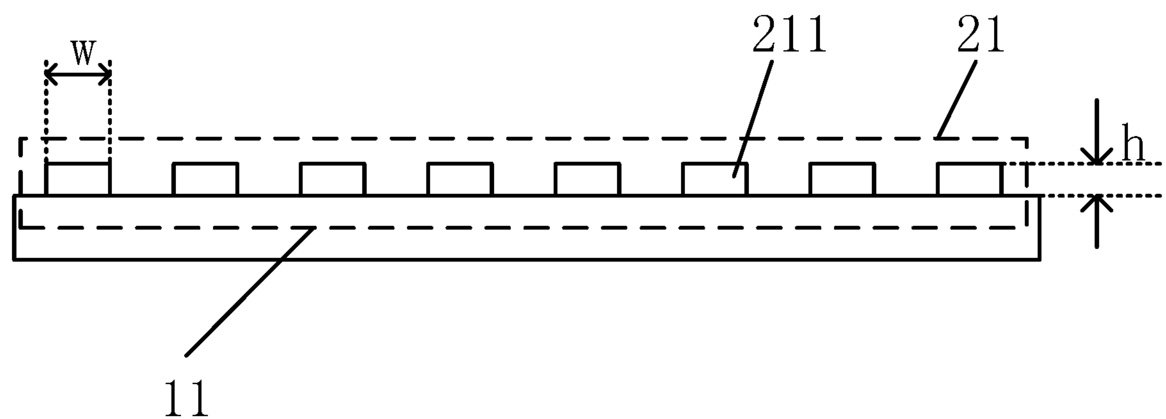
FIG. 3 is a schematic diagram of the wire grid polarizer according to the embodiment of the present disclosure.

FIG. 1 is a flowchart of a manufacturing method of a wire grid polarizer according to an embodiment of the present disclosure. FIG. 2 is a schematic diagram partially illustrating the manufacturing method of the wire grid polarizer according to the embodiment of the present disclosure. FIG. 3 is a schematic diagram of the wire grid polarizer according to the embodiment of the present disclosure. In this embodiment, the manufacturing method of the wire grid polarizer includes the following steps:

In a step S11, pattern data are set. The pattern data correspond to a wire grid structure of the wire grid polarizer, and the wire grid structure includes a plurality of wire grids which are arranged separately from each other.

In the step S11, for example, the pattern data of the wire grid structure 21 are copied to an emitter device, and a wire grid structure 211 may include the plurality of wire grids 21 which are parallel and arranged separately from each other.

The emitter device may include an axial electron gun and a motion control device. The motion control device controls a movement of the axial electron gun according to the pattern data, and the axial electron gun is used to emit electron beam s.

In a step S12, a metal ion solution is prepared.

In the step S12, the preparation of the metal ion solution 13 may include reacting a metal oxide with an acid to form the metal ion solution 13 containing metal ions. Specifically, the metal may be aluminum, the metal ion may be aluminum ion $Al^{3+}$, and the acid may be hydrochloric acid, and a reaction formula for preparing the aluminum ion solution may be:

$$Al_2O_3+6H^+\rightarrow 2Al^{3+}+3H_2O$$

The metal may also be palladium, and the metal ion may be a chloropalladate ion, and a reaction formula for preparing the palladium ion solution may be:

$$PdCl_2+2Cl^-\rightarrow [PdCl_4]^{2-}$$

The metal ion can be a chloroaurate ion, and a reaction formula for preparing the gold ion solution can be:

$$AuCl_3+Cl^-\rightarrow [AuCl_4]^-$$

In a step S13, at least one surface of a carrier substrate is immersed in the metal ion solution.

In the step S13, the step of immersing at least one surface of the carrier substrate 11 or the carrier substrate 12 in the metal ion solution 13 may include: disposing a spacer 15 between the two carrier substrates 11 and 12. The metal ion solution 13 is encapsulated between the two carrier substrates 11 and 12. For example, the metal ion solution 13 may be encapsulated between the two carrier substrates 11 and 12 by using a sealant 14. The spacer 15 may be a gold ball 15, and the spacer 15 may be disposed in the sealant 14 or may be disposed in the metal ion solution 13. The spacer 15 causes a gap between the two carrier substrates 11 and 12, and a size g of the gap determines the height of the subsequently deposited wire grids 211. For example, when the spacer 15 is a golden ball 15, the height h of the wire grids is equal to a diameter of the golden ball 15. The carrier substrates 11 and 12 may have an area of 550×550 $um^2$.

In a step S14, an electron beam emits to the carrier substrate by the emitter device, and a movement of the electron beam is controlled according to the pattern data to deposit the metal on the carrier substrate at a position where the electron beam passes, to form the wire grid structure.

In the step S14, the step of emitting the electron beam s to the carrier substrate by the emitter device includes: setting a diameter of the electron beam s, where the diameter ranges from 0.05 nm to 1 nm. Specifically, it can be 0.2 nm. The carrier substrate 11 or the carrier substrate 12 is made of a transparent material that can transmit the electron beam s. Specifically, the carrier substrate 11 or the carrier substrate 12 may be made of silicon nitride (SiNx). Specifically, the emitter device may be a scanning transmission electron microscopy (STEM). First, the encapsulated two carrier substrates are placed in a sample chamber of the scanning transmission electron microscopy, and the scanning transmission electron microscopy is selected to have a voltage of 300 KV, a diameter the electron beam s of 0.2 nm, a current of 60 to 80 pA. The scanning transmission electron microscopy uses the concentrated electron beam s to scan on the carrier substrate 11 to complete the deposition of the metal on a surface of the carrier substrate 11 in contact with the solution. In the scan mode, the field emission electron source emits electrons to form the electron beam s, and the electron beam s is concentrated into atomic-scale beam spots by a magnetic lens and a diaphragm in front of a sample. After the electron beam spot is focused on the surface of the carrier substrate 11, a region a of the carrier substrate 11 is scanned point by point controlled by coil according to the pattern data. The electrons in the electron beam s react with metal ions, and the metal ions are reduced by electrons. Taking aluminum ions as an example, the reaction formula of the reduction deposition is: $Al^{3+}+3e^-\rightarrow Al$. Therefore, the aluminum is deposited on the carrier substrate 11 at the region a where the electron beam passes.

While scanning each point, a detector below the sample synchronously receives the scattered electrons. The signal received by the detector corresponding to each scanning position is converted to a current intensity displayed on a fluorescent screen or computer display. Each point on the sample corresponds to the resulting image point.

The wire grid 211 of the wire grid structure 21 has a width w of 30 to 100 nm. Because the diameter of the electron beam s is 0.2 nm, the electron beam s can be controlled to repeatedly scan to the required width of the wire grid 211 according to the pattern data.

The wire grid 211 of the wire grid structure 21 has a height h of 50 to 300 nm. The height can be selected according to different sizes of spacer 15, for example, gold balls 15 of different diameters are selected to obtain different heights of the wire grid 211.

The present disclosure includes: setting pattern data, where the pattern data correspond to a wire grid structure of the wire grid polarizer, and the wire grid structure includes a plurality of wire grids which are arranged separately from each other; preparing a metal ion solution; immersing at least one surface of a carrier substrate in the metal ion solution; and emitting, by an emitter device, an electron beam to the carrier substrate, and controlling a movement of the electron beam according to the pattern data to deposit a metal on the carrier substrate at a position where the electron beam passes, to form the wire grid structure. After the electron beam passes, the metal ions acquire electrons and are reduced to metal which is deposited in a position corresponding to the pattern data, so that the wire grid structure is formed on the carrier substrate, and the carrier substrate and the wire grid structure constitute the wire grid polarizer. The wire grid polarizer of the present disclosure has simple process and high manufacturing precision, and is favorable for industrial production.

The above description is only the preferred embodiments of the present disclosure and is not intended to limit the scope of the present disclosure. Any modification of equivalent structures or equivalent procedures made using the specification and the accompanying drawings of the present disclosure or applied in other relevant technical fields directly or indirectly should be covered within the protection scope of the present disclosure likewise.

What is claimed is:

1. A manufacturing method of a wire grid polarizer, comprising:

setting pattern data, wherein the pattern data correspond to a wire grid structure of the wire grid polarizer, and the wire grid structure comprises a plurality of wire grids which are arranged separately from each other;

preparing a metal ion solution;

immersing at least one surface of at least one carrier substrate of two carrier substrates in the metal ion solution; and emitting, by an emitter device, an electron beam to the at least one carrier substrate, and controlling a movement of the electron beam according to the pattern data to deposit a metal on the at least one carrier substrate at a position where the electron beam passes, to form the wire grid structure;

wherein the step of immersing the at least one surface of the at least one carrier substrate of the two carrier substrates in the metal ion solution comprises: encapsulating the metal ion solution between the two carrier substrates; and wherein the step of emitting, by the emitter device, the electron beam to the at least one carrier substrate comprises: determining a diameter of the electron beam ranging from 0.05 nm to 1 nm.

2. The manufacturing method as claimed in claim 1, before encapsulating the metal ion solution between the two carrier substrates, further comprising: disposing a spacer between the two carrier substrates.

3. The manufacturing method as claimed in claim 1, wherein the metal ion solution is an aluminum ion solution and the metal is aluminum.

4. The manufacturing method as claimed in claim 1, wherein the metal ion solution is a palladium ion solution and the metal is palladium.

5. The manufacturing method as claimed in claim 1, wherein the metal ion solution is a gold ion solution and the metal is gold.

6. The manufacturing method as claimed in claim 1, wherein a width of each wire grid ranges from 30 nm to 100 nm.

7. The manufacturing method as claimed in claim 1, wherein a height of each wire grid ranges from 50 nm to 300 nm.

8. The manufacturing method as claimed in claim 1, wherein material of the at least one carrier substrate comprises silicon nitride.

9. A manufacturing method of a wire grid polarizer, comprising:

setting pattern data, wherein the pattern data correspond to a wire grid structure of the wire grid polarizer, and the wire grid structure comprises a plurality of wire grids which are arranged separately from each other;

preparing a metal ion solution;

immersing at least one surface of at least one carrier substrate of two carrier substrates in the metal ion solution; and emitting, by an emitter device, an electron beam to the at least one carrier substrate, and controlling a movement of the electron beam according to the pattern data to deposit a metal on the at least one carrier substrate at a position where the electron beam passes, to form the wire grid structure.

10. The manufacturing method as claimed in claim 9, wherein the step of immersing the at least one surface of the at least one carrier substrate of the two carrier substrates in the metal ion solution comprises: encapsulating the metal ion solution between the two carrier substrates.

11. The manufacturing method as claimed in claim 10, before encapsulating the metal ion solution between the two carrier substrates, further comprising: disposing a spacer between the two carrier substrates.

12. The manufacturing method as claimed in claim 9, wherein the step of emitting, by the emitter device, the electron beam to the at least one carrier substrate comprises: determining a diameter of the electron beam ranging from 0.05 nm to 1 nm.

13. The manufacturing method as claimed in claim 9, wherein the metal ion solution is an aluminum ion solution and the metal is aluminum.

14. The manufacturing method as claimed in claim 9, wherein the metal ion solution is a palladium ion solution and the metal is palladium.

15. The manufacturing method as claimed in claim 9, wherein the metal ion solution is a gold ion solution and the metal is gold.

16. The manufacturing method as claimed in claim 9, wherein a width of each wire grid ranges from 30 nm to 100 nm.

17. The manufacturing method as claimed in claim 9, wherein a height of each wire grid ranges from 50 nm to 300 nm.

18. The manufacturing method as claimed in claim 9, wherein material of the at least one carrier substrate comprises silicon nitride.

* * * * *